US007768629B2

(12) United States Patent
Typpo et al.

(10) Patent No.: US 7,768,629 B2
(45) Date of Patent: Aug. 3, 2010

(54) DEVICE AND PROCESS FOR OPTICAL DISTANCE MEASUREMENT

(75) Inventors: Pekka Typpo, Cupertino, CA (US); Lee Chase, Los Gatos, CA (US)

(73) Assignee: Voith Patent GmbH, Heidenheim (DE)

( * ) Notice: Subject to any disclaimer, the term of this patent is extended or adjusted under 35 U.S.C. 154(b) by 244 days.

(21) Appl. No.: 11/737,408

(22) Filed: Apr. 19, 2007

(65) Prior Publication Data

US 2007/0263203 A1   Nov. 15, 2007

Related U.S. Application Data

(63) Continuation-in-part of application No. 11/383,089, filed on May 12, 2006.

(51) Int. Cl.
*G01C 3/08*   (2006.01)

(52) U.S. Cl. ................ 356/4.01; 356/4.03; 356/4.07

(58) Field of Classification Search ....... 356/4.01–5.15, 356/28, 28.5
See application file for complete search history.

(56) References Cited

U.S. PATENT DOCUMENTS

| 4,198,571 | A | | 4/1980 | Sheppard |
| 4,844,617 | A | | 7/1989 | Kelderman et al. |
| 4,897,536 | A | * | 1/1990 | Miyoshi .................. 250/201.6 |
| 5,737,084 | A | * | 4/1998 | Ishihara ...................... 356/609 |
| 5,831,720 | A | * | 11/1998 | Ishida et al. ................ 356/28.5 |
| 5,831,736 | A | * | 11/1998 | Lichtman et al. ............. 356/613 |
| 6,031,661 | A | * | 2/2000 | Tanaami ...................... 359/368 |
| 6,111,690 | A | | 8/2000 | Tanaami |
| 6,388,808 | B1 | | 5/2002 | Tanaami |
| 6,862,097 | B2 | * | 3/2005 | Yanagisawa et al. ........ 356/602 |
| 6,904,199 | B2 | | 6/2005 | Zuluaga |
| 2003/0169414 | A1 | * | 9/2003 | Benz et al. .................... 356/5.1 |
| 2004/0252310 | A1 | * | 12/2004 | De Lega et al. ............. 356/511 |
| 2005/0157314 | A1 | | 7/2005 | Typpoe et al. |
| 2006/0232790 | A1 | | 10/2006 | Chase et al. |

FOREIGN PATENT DOCUMENTS

| DE | 2818651 | 11/1978 |
| EP | 0534288 | 3/1993 |
| EP | 1548398 | 6/2005 |

OTHER PUBLICATIONS

English language abstract of EP 0534288.

* cited by examiner

*Primary Examiner*—Isam Alsomiri
(74) *Attorney, Agent, or Firm*—Greenblum & Bernstein, P.L.C.

(57) ABSTRACT

Device and process for determining a distance to an object. The device includes a low coherence light source, at least one lens arranged to focus light from the low coherence light source onto the object and to collect light reflected and scattered from the object, and a window arranged between the lens and the object. An apertured element includes a circular aperture structured and arranged to form a circular light beam from the reflected and scattered light, and a detector system is structured and arranged to receive the circular light beam. The detector system is sensitive to light beam diameter. Further, a determining device is structured and arranged to determine a distance to the object based upon signals from the detector system.

43 Claims, 7 Drawing Sheets

DEVICE AND PROCESS FOR OPTICAL DISTANCE MEASUREMENT

CROSS REFERENCE TO RELATED APPLICATION

The instant application is a Continuation-in-Part of U.S. patent application Ser. No. 11/383,089 filed May 12, 2006, the disclosure of which is expressly incorporated by reference herein in its entirety.

BACKGROUND OF THE INVENTION

1. Field of the Invention

The invention relates to an optical distance measuring device and process in a web production machine, e.g., a paper or board machine, for measuring a parameter of the web, e.g., web thickness, surface roughness, etc. More particularly, the invention relates to an air bearing supported optical distance measuring device measuring a distance to the web.

2. Discussion of Background Information

Known optical distance measurement in the micrometer range is generally based on either laser triangulation or confocal principle. Laser triangulation is accomplished by a device projecting a small spot of light onto a surface. A lens having an optical axis oriented at an angle to the axis of the projected light forms an image of the spot onto a position sensitive detector. As the surface moves closer or farther from the device, the image of the spot moves, such that the output of the position sensitive detector is used to determine the distance from the device to the surface.

In accordance with the confocal principle, a confocal sensor light from a source, typically a laser, passes through a beam splitting mirror and is focused onto an object through a lens. Light scattered back from the object returns through the same lens, is separated from the source beam by the beam splitting mirror and is focused onto a pinhole. A detector behind the pinhole collects light that passes through it.

When the object is at exactly the focal point of the lens system, the image of the laser spot is tightly focused on the pinhole and the detector collects the maximum possible light. When the object moves away from the focal point, the image of the laser spot at the pinhole spreads out, such that less light passes through the pinhole to the detector.

Distance is measured by moving the pinhole and finding the distance at which the maximum amount of light penetrates the pinhole. Alternative methods for measuring distance are also known, e.g., as described in U.S. patent application Ser. No. 11/108,337, the disclosure of which is expressly incorporated by reference herein in their entirety.

However, a difficulty arises with optical devices using the coherent light from a laser diode. Coherence is the property of light that enables it to exhibit interference. To be coherent, a light source must be monochromatic and emit light waves in phase. In theory, perfectly coherent light will remain coherent until disrupted. Light emitted from a nearly coherent source will lose its coherence after some distance. The distance light travels before it loses its coherence is the coherence length. Lasers emit light with a high degree of coherence. Even small amount of coherent stray light reflected and/or scattered from the source can interfere with the measurement of the relatively small amount of light backscattered from the object being measured. Also, very small amounts of light reflected back into the laser diode can cause significant interference with the functioning of the laser diode. Of particular difficulty are reflections from optical surfaces such as windows, beam splitters and lenses because the reflected light often follows the same path as the light to be measured. While anti-reflection coatings reduce reflected light to a fraction of a percent, with an intense source even this fraction is sufficient to cause problems. The above-noted conventional confocal microscope mitigates the effect of stray light to some extent by using a tiny pinhole at the focal point of the collecting lens. However, reflected light traveling the same path as the light being measured is allowed through the pinhole into the detector and can interfere with the measurement.

It is likewise known to utilize an optical device to observe surface topography at high speed (several MHz) in order to measure roughness. In the paper industry, surface roughness is a parameter relating directly to print quality. High quality printing grades go through coating and calendering steps to improve roughness and therefore print quality.

Further, the thickness (caliper) of a sheet can be measured with two (2) optical devices located on opposite sides of the sheet and separated by a known distance. If the distance between the optical devices is not constant, it can be measured with an inductive device that is not sensitive to the presence of the sheet. Thickness is calculated by subtracting the measured distances from the two optical devices to respective surfaces of the sheet from the distance between the optical devices.

Moreover, it is known to use an air bearing supported sensor to follow the sheet, but such sensors must be very small and light. However, this small size results in a light source located very near the sheet, such that the resulting optical light path to be measured is very short. Also, a significant fraction of the light reflected from the sheet and the surfaces of the window can be traveling back into the light source. If the source is a laser diode, this optical feedback is still coherent with the outgoing beam and can cause significant changes in the output amplitude.

With a fixed distance from the source to the window and a variable distance to the sheet, the two reflections from the window will interfere with the reflection from the sheet in such a way that the interference will be either destructive or constructive depending on the distance from the window to the sheet. Thus, the intensity of the light reflected back into the light source will not be constant, making the feedback effect very serious. Periodic variations are caused by the above-noted optical feedback, and the period of the error curve is approximately half of the wavelength used. If a laser is used as a source with a window close to the sheet, then, to reduce periodic variations, the reflections back to the laser must be reduced to a very small percentage of the output intensity. The reflection from the inner side of the window will be attenuated naturally because it is relatively far from the focal area near the sheet, but the outer side of the window is very close to the sheet and the reflection from that surface will almost inevitably end up going back to the light source, particularly because the sensor has been miniaturized so that it can be supported by an air bearing.

Methods have been devised in an effort to limit this effect. Such methods include using a very small source aperture or adding a strongly attenuating neutral density filter to the source beam. While both of these methods reduce the feedback effect, they also reduce the available signal intensity significantly. Other possible methods use optical surfaces that are either not flat or not in a right angle relative to the optical axis of the sensor. These methods complicate the design, and the outer side window surface, which is most likely to cause the problem, should be flat and parallel with the sheet, i.e., it will be at least nearly perpendicular to the optical axis.

An anti-reflection coating on the outer side of the sensor window will not last because it will occasionally be scraped off by the moving sheet of a paper machine. A fast flutter of the paper sheet combined with the inertia of the sensor can overcome the force of the air bearing allowing the sheet to scrape occasionally. Cleaning the surface would also eventually destroy the coating.

SUMMARY OF THE INVENTION

The present invention provides a device and process for the optical measurement of the distance to the paper surface. Moreover, the distance measurement can have a repeatability that is better than 0.25 micrometers.

The present invention can be utilized for the measurement of paper surface roughness. However, the uses for the instant invention are not limited to the examples described herein, and other uses utilizing the features of the invention are contemplated.

The invention provides a device and process that includes the optical distance measurement of parent U.S. patent application Ser. No. 11/383,089 with a flat window arranged to be flush with an air bearing surface and supported by an air bearing at a 100-300 micrometer distance from the paper surface. Further, the sensor measures the distance to the paper surface with a repeatability that is better than 0.25 micrometers.

The invention produces an optical distance sensor fast enough to measure small scale surface topography of the sheet in a high speed paper machine for surface roughness measurement. The sensor therefore requires a response speed in the megahertz range.

The present invention utilizes a superluminescent diode (SLD). Like laser diodes, light from an SLD is emitted from a very small area, which is advantageous for the light source of the sensor according to the invention. Moreover, the coherence length for a SLD is only a few tens of micrometers (whereas laser diodes have coherence lengths that can be several meters), so reflections that might go back to the source will not interfere with each other. While the reflections will have an influence on the SLD's output intensity, instead of large variations with variable distance to the sheet, the reflection effect is essentially constant.

The window provides a continuous smooth surface parallel and flush with the air bearing surface, and interference effects are avoided by using an SLD with a coherence length of only a few tens of micrometers.

The present invention is directed to a device for determining a distance to an object. The device includes a low coherence light source, at least one lens arranged to focus light from the low coherence light source onto the object and to collect light reflected and scattered from the object, and a window arranged between the lens and the object. An apertured element having a circular aperture is structured and arranged to form a circular light beam from the reflected and scattered light, and a detector system is structured and arranged to receive the circular light beam. The detector system is sensitive to light beam diameter. Further, a determining device is structured and arranged to determine a distance to the object based upon signals from the detector system.

In accordance with a feature of the instant invention, the low coherence light source can be a superluminescent diode.

According to another feature, the low coherence light source can produce a coherence length significantly less than twice a distance between the object and a surface of the window facing the object. According to still another feature of the present invention, the window may be flush with an air bearing surface.

Further, the device can include an air bearing, such that the window is supported by the air bearing at a distance of 100-300 micrometers from the object.

According to a feature of the invention, the apertured element can have an annular aperture structured and arranged to form an annular light beam from the reflected and scattered light, and the determining device may be structured and arranged to receive the annular light beam, wherein the detector system is sensitive to light beam diameter.

In accordance with another feature of the present invention, the at least one lens can be structured and arranged to collimate the source light to a narrow central beam.

According to still another feature of the instant invention, the at least one lens can include an aspheric lens structured and arranged to focus the source light onto the object. Moreover, the at least one lens can include a plano-convex lens structured and arranged to focus the source light onto the object.

The device may also include an element arranged in a path of the cylindrical light beam to allow only the cylindrical beam to pass and to block other light.

Further, according to the invention, the object is a moving object and the analyzer measures the distance to the object by receiving a high frequency component of the detector system signals to measure an amount of light with high frequency variations reflected and scattered from a surface of the object and passing the annular aperture and directed to the detector system, and analyzing high frequency signals to determine the distance to the surface of a moving object.

In accordance with another feature, the distance determination in the analyzer may be a measure of surface profile.

The at least one lens can include at least one lens arrangement positioned on each side of the object, and the analyzer may be further structured and arranged to determine the caliper of the object. A separation between the lens arrangements can be known, and the caliper can be determined in the analyzer by determining the distance to the object from each lens arrangement, and subtracting a sum of the determined distances from a separation of the lens arrangements. The object can be a moving web.

The device can also include a wedge-shaped ring prism having a hole with a diameter corresponding to the diameter of the cylindrical light beam. The ring prism can be positioned upstream of the detector system relative to the optical direction so light falling inside the diameter of the hole is directed in one direction while light falling outside the diameter of the hole is bent by the prism in another direction. The detector system may include at least two detectors arranged to receive the light directed in the one direction and to receive the light bent in the another direction. Moreover, another wedge-shaped prism can be arranged in the hole of the wedge-shaped ring prism. The wedge-shaped prisms can be arranged upstream of the detector system relative to the optical direction so that light falling inside the diameter of the hole is bent by the inside prism in one direction while light falling outside the diameter of the hole is bent by the outside prism in another direction.

According to a further feature, the invention can include a flat window with a hole and a lens arranged in the hole, so that light falling inside the diameter of the hole is focused by the lens in one direction, and a mirror arranged downstream of the flat window and lens to direct light falling outside the diameter of the hole, which passes through the flat window, in another direction.

In accordance with a still further feature, the invention can include a beam splitter arranged to split the cylindrical light, a second apertured element having an annular aperture having an inner diameter corresponding to the diameter of the cylindrical light, and a third apertured element having an annular aperture having an outer diameter corresponding to the diameter of the cylindrical light. A first split portion of the split cylindrical light may be directed through the second apertured element so that an increasing amount of light will pass to a detector of the detector system as the cylindrical beam diameter increases, and a second split portion of the split cylindrical light may be directed through the third apertured element so that an increasing amount of light will pass to another detector of the detector system as the cylindrical beam diameter decreases.

According to another feature of the instant invention, the detector can include concentric detectors. Further, the detector may include a detector array or the detector can include an imaging array. The light source may include an superluminescent diode.

The present invention is directed to a process for determining a distance to an object. The process includes focusing, with at least one lens, light from a low coherence light source onto the object through a window, and collecting, with the at least one lens, light reflected and scattered from the object. The process also includes forming a cylindrical light beam from the reflected and scattered light, and monitoring the diameter of the cylindrical light beam, and determining a distance to the object based upon signals related to the monitored diameter of the cylindrical light beam.

According to a feature of the present invention, the process can further include maintaining a distance of 100-300 micrometers between the object and a surface of the window facing the object. Moreover, the distance can be maintained with an air bearing.

In accordance with another feature, the window can be arranged flush with an air bearing.

According to still another feature of the invention, the low coherence light source may be a superluminescent diode.

Further, the low coherence light source can produce a coherence length significantly less than twice a distance between the object and a surface of the window facing the object.

In accordance with a feature of the invention, the process can further include collimating the source light to a narrow central beam.

According to a further feature, the process can include allowing the cylindrical light beam to pass while blocking other light.

Moreover, the determining of the distance may include receiving a high frequency component of the detector system signals to measure an amount of light with high frequency variations reflected and scattered from a surface of the object and passing the annular aperture and directed to the detector system, and analyzing high frequency signals to determine the distance to the surface of a moving object.

The process can also include measuring a surface profile of the object.

Further, the process may also include determining the caliper of the object. A separation between the lens arrangements can be known, and the determining the caliper may include determining the distance to the object from each lens arrangement, and subtracting a sum of the determined distances from a separation of the lens arrangements. The object may be a moving web.

The process can further include directing the cylindrical light beam through a wedge-shaped ring prism having a hole with a diameter corresponding to the diameter of the cylindrical light beam, directing light falling inside the diameter of the hole in one direction, and bending light falling outside the diameter of the hole in another direction.

According to still another feature of the invention, the process can include directing the cylindrical light beam through a wedge-shaped ring prism having a hole with a diameter corresponding to the diameter of the cylindrical light beam with another wedge-shaped prism arranged in the hole, bending light falling inside the diameter of the hole in one direction, and bending light falling outside the diameter of the hole in another direction.

According to another feature, the process may include directing the cylindrical light beam through a flat window with a hole and a lens arranged in the hole, focusing light falling inside the diameter of the hole in one direction, and directing light falling outside the diameter of the hole, which passes through the flat window, in another direction.

In accordance with still yet another feature of the present invention, the process can include splitting the cylindrical light, directing a first split portion of the split cylindrical light through the second apertured element so that an increasing amount of light will pass to a detector of the detector system as the cylindrical beam diameter increases, and directing a second split portion of the split cylindrical light through the third apertured element so that an increasing amount of light will pass to another detector of the detector system as the cylindrical beam diameter decreases.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
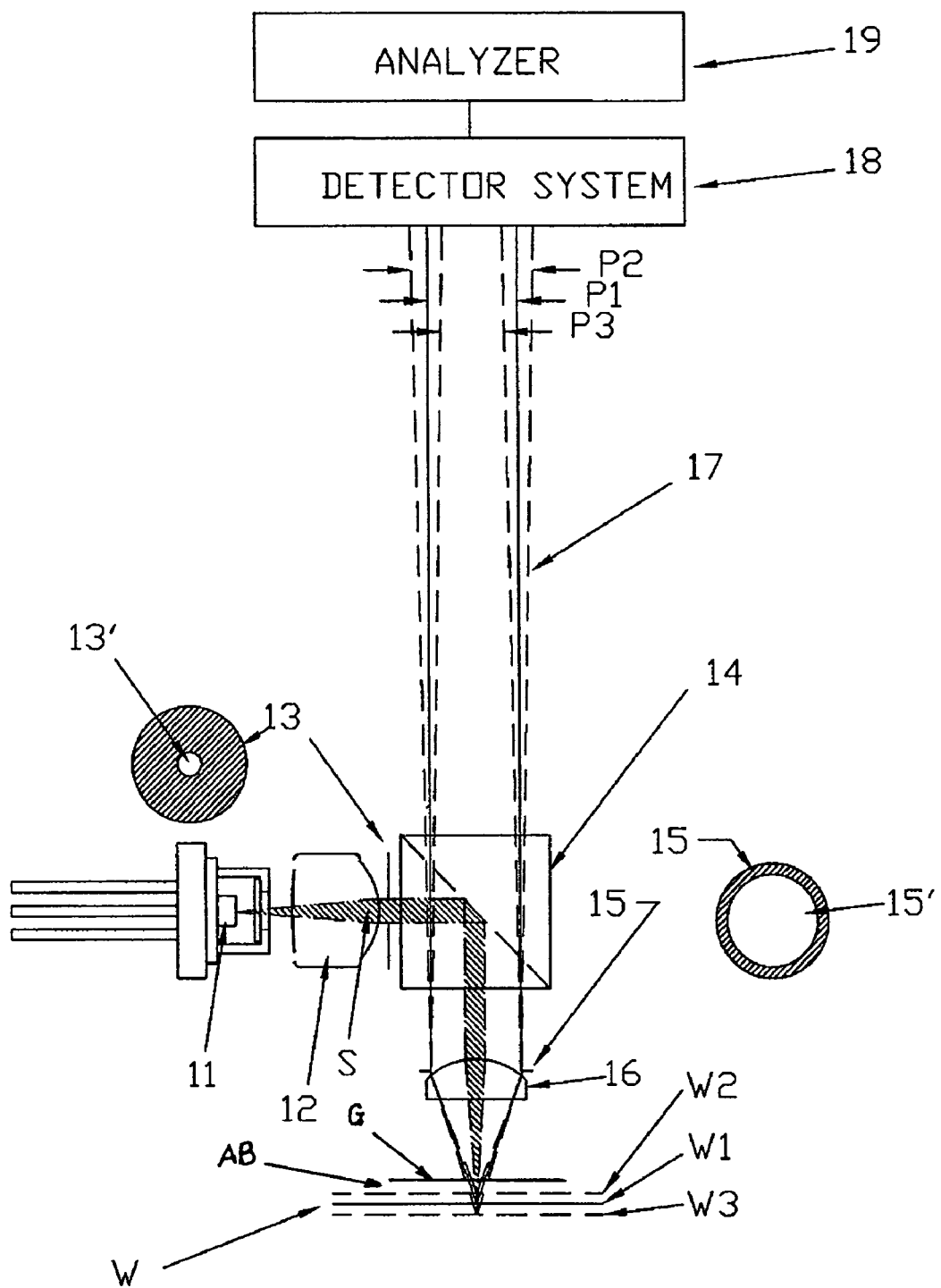
FIG. 1 diagrammatically illustrates a device combining features of a confocal sensor with features of laser triangulation in accordance with the present invention.

The present invention combines features of a confocal sensor supported on an air bearing with features of laser triangulation. As shown in FIG. 1, a light source 11, e.g., a low coherence light source, such as a superluminescent diode (SLD), generates a source beam S directed through a lens or lens system 12 through a first apertured element 13 with an aperture 13' having an opening diameter of, e.g., 1 mm. An SLD is used instead of a laser diode because, like a laser diode, light is emitted from a very small area, but the coherence length of the SLD is only a few tens of micrometers, as compared to the laser diode's coherence length of several meters. Moreover, it is noted that the size of aperture 13' can be as large as the diameter of the lens 12, in which case the first apertured element 13 can be dispensed with and lens 12 can act as the aperture. Source beam S is deflected 90° by beam splitter 14 through a focusing lens 16 and a window G to direct a small spot of light onto the surface of a sheet or web W, e.g., paper or board. A small 45° mirror can be used in place of the beam splitter 14. Focusing lens 16 may be either a small plano-convex lens or an aspheric lens. A multi-element lens system similar to microscope objectives can also be used. Source beam S is normally narrow to allow the source spot on sheet W to remain small even when the distance to sheet W varies. However, if the measuring range is limited, source beam S can be as large as the opening of lens 16. Further, the light source is a low coherence source with a coherence length significantly less than twice a distance between the surface of sheet W and an outer surface of window G.

While the present invention is directed to measuring distance to an object, such as a web or sheet, the accuracy of the measurement can be improved if the distance being measured is made short and any range of variation of the distance is small. However, while close proximity to the object being measured is desirable, touching it often is not. In this regard, when measuring fine paper moving at high speed, if the sheet is inadvertently contacted, the sheet can be seriously damaged.

In order to maintain close proximity to, without contacting, the object, the device or sensor can be mounted on or coupled to an air bearing AB to maintain a predefined distance from the surface of sheet W. Such an air bearing AB can be created or formed, e.g., by placing a disc having tiny orifices through which air is injected flat onto the surface of sheet W so air escaping through the orifices toward the sheet surface lifts the disc off the surface to a height depending upon the airflow, e.g., typically averaging between 100 and 300 micrometers. When the device or sensor on or coupled to air bearing AB is scanned across the object surface, local variations in the surface contours can be accurately measured as deviations from average air bearing height. Further, the average air bearing height can be stabilized by using the average measured distance to control airflow. Further, window G can be a flat window to provide a continuous smooth surface to form a parallel and flush surface supported by air bearing AB that maintains a predefined distance between the sensor and sheet W. Thus, window G, and therefore, the sensor, can be supported by air bearing AB to be flush with the air bearing surface to maintain a 100-300 micrometer distance from the sheet surface. Window G likewise provides added protection for the sensor, since it is understood that cavities on the surface of a device located in close proximity to a moving paper web will rapidly fill with dirt and paper dust, whereas the smooth surface of window G reduces this tendency and makes cleaning easier. Moreover, window G provides a smooth continuous surface for the sensor without sacrificing accuracy or speed of measurement.

Some of the small spot of light incident upon sheet W is reflected and scattered back through lens 16, which forms a circular light beam passing through an aperture 15' of apertured element 15. When sheet W is positioned exactly at the focus of the lens or lens system, i.e., at W1, the circular light beam 17 will follow a cylindrical path P1 parallel to the optical axis. Moreover, as shown in FIG. 1, when the object (sheet W) distance changes, circular light beam 17 will either diverge or converge, depending on the direction of the change. For example, when sheet W moves to the position W2 closer to lens 16, circular light beam 17 will diverge along path P2, and when sheet W moves to the position W3 farther from lens 16, circular light beam 17 will converge along path P3. Aperture 15 is used to select a suitable area of lens 16. However, with an appropriately chosen lens, it is possible to dispense with aperture 15 and instead use the entire lens area. Further, as a result of using the SLD, reflections that might go to the source will not interfere with each other. Thus, while reflections still have an influence on the SLD's output intensity, instead of large variations with variable distance to the sheet, the reflection effect is essentially constant.

Thus, when viewed parallel to the optical axis, the circular image of light 17 has a diameter that either grows or shrinks depending on the object distance. A detector system 18, capable of detecting the size of the image, is placed at a suitable distance from the objective lens system. The distance determines the optical magnification and thus the sensitivity of the sensor since the diameter of the image grows or shrinks more as the distance from the objective lens increases. An analyzer 19 is coupled to detector system 18 to receive and analyze detector signals in order to determine the distance to the object or web. The operation of the analyzer will be more fully discussed below.

With the conventional confocal principle, the return light focuses onto a tiny pinhole, which must be precisely aligned with the image in order to accurately measure the return light intensity. For example, a 25 micrometer misalignment could result in no light reaching the detector. In contrast, the present invention collimates the return light from the object (sheet W) to a parallel circular light beam 17 with a larger diameter. Alignment is comparatively less critical since the circular beam is much larger, about 3 mm, and a 25 micrometer misalignment is negligible.

Detector system 18 can be formed by any of several possible detector arrangements capable of detecting the image diameter. While an imaging sensor such as a CCD or CMOS array may be an obvious choice, these devices are too slow for the application intended by the present invention. Thus, to achieve high speed measurement, the present invention employs a plurality of detectors, preferably just two detectors, in which one detector is arranged to collect all the light that falls outside a nominal image diameter and another collects all the light that falls inside the nominal image diameter. The sensors operate in a differential manner for changes in image diameter, such that as light in one detector increases, light in the other detector decreases.

Figure 2:
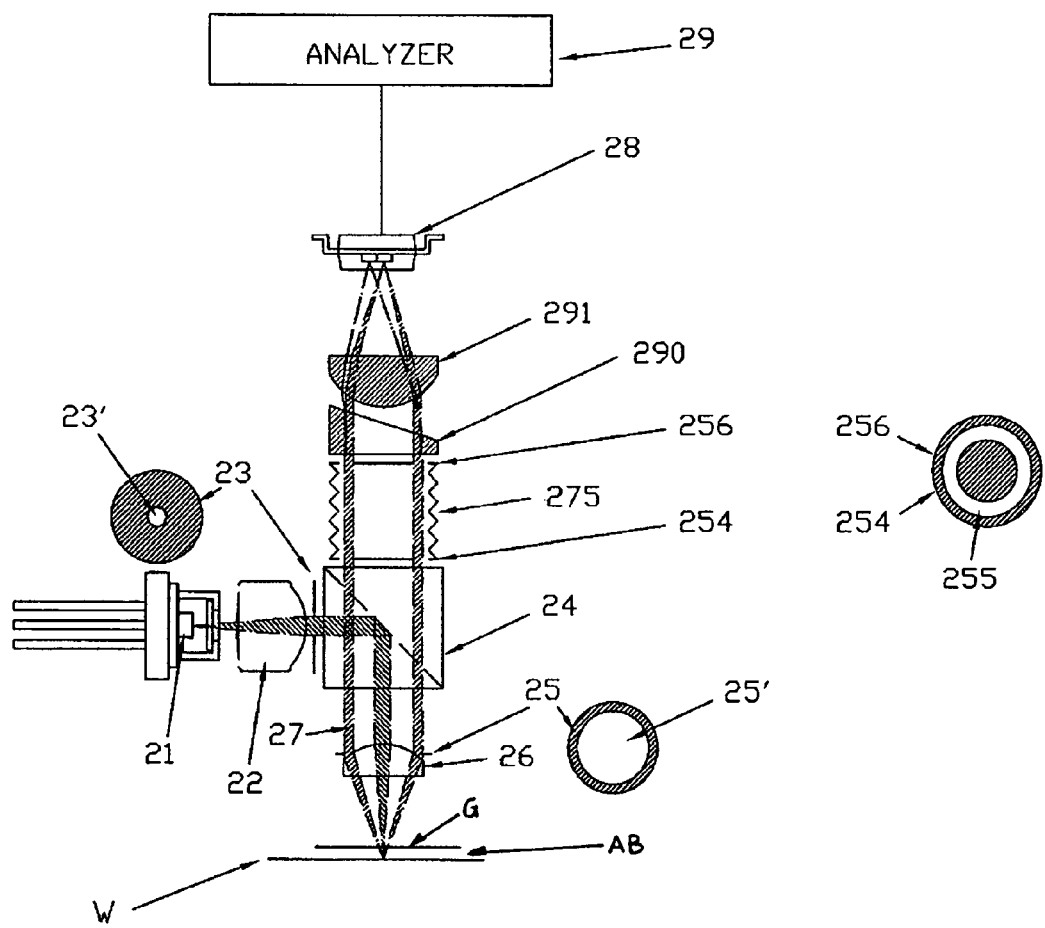
FIG. 2 diagrammatically illustrates an alternative embodiment of the invention depicted in FIG. 1.

In an exemplary embodiment shown in FIG. 2, a light source 21, e.g., an SLD because of its small size and high intensity, produces a light beam directed through a condenser lens 22, which collects the light beam to form a parallel beam. A first apertured element 23 with an aperture 23' having a diameter of, e.g., 1 mm, produces or forms a narrow beam incident on beam splitter 24, e.g., a 45° angle beam splitter, to deflect the beam 90°. Of course other angles can be chosen as well. Half the light beam incident upon beam splitter 24 is reflected and directed through second aperture 25' of apertured element 25, through an objective lens 26 and through window G to be focused onto object surface W at normal incidence. The other half of the laser beam that continues straight through beam splitter 24 is collected in a light trap and not utilized. Preferably, for increased efficiency, beam splitter 24 can be replaced by a small diameter mirror that reflects 100% of the laser beam but does not interfere with returning light.

Light reflected and scattered from the object surface W is collected by objective lens 26 and collimated toward aperture 25', which may have an opening width of, e.g., 3 mm. Cylindrical beam 27 thus formed goes through beam splitter 24 (or around the small diameter mirror) to ring prism 290. Ring prism 290 can be formed as a wedge prism with a hole in the middle, in which the hole diameter is the nominal image diameter, e.g., 3 mm. Accordingly, light falling outside the nominal image diameter is bent by prism 290 and light inside the nominal image diameter goes straight through the hole. A lens 291 placed after ring prism 290 focuses the light passing through the hole of ring prism 290 to a spot on the optical axis, while the light passing through ring prism 290 focuses to a spot offset from the optical axis. A detector 28, which can be formed by two separate detectors placed at the focus spots, measures the light intensity falling inside and outside the nominal image diameter. An analyzer 29, the specifics of which are more fully discussed below, is coupled to detector system 28 to receive and analyze signals from the separate detectors in order to determine the distance to the object or web.

Because an SLD is so intense, even a small fraction scattered into detector 28 could be significant. Thus, to improve the performance of the exemplary embodiment, a third apertured element 254 and a fourth apertured element 256, which have annular openings 255, can be placed between beam splitter 24 (or mirror) and ring prism 29. Annular openings 255, which can have opening widths of, e.g., 0.5 mm in apertured elements 254 and 256, allow only the desired cylindrical beam to pass and block any stray light. Further, a spacer 275 can be positioned between apertured elements 254 and 256 to separate these elements by a distance of, e.g., 6 mm, and spacer 275 can be provided with serrated sides to reflect light back towards the source. Such a formed light trap effectively isolates light source 21 from detector 28.

Figure 3:
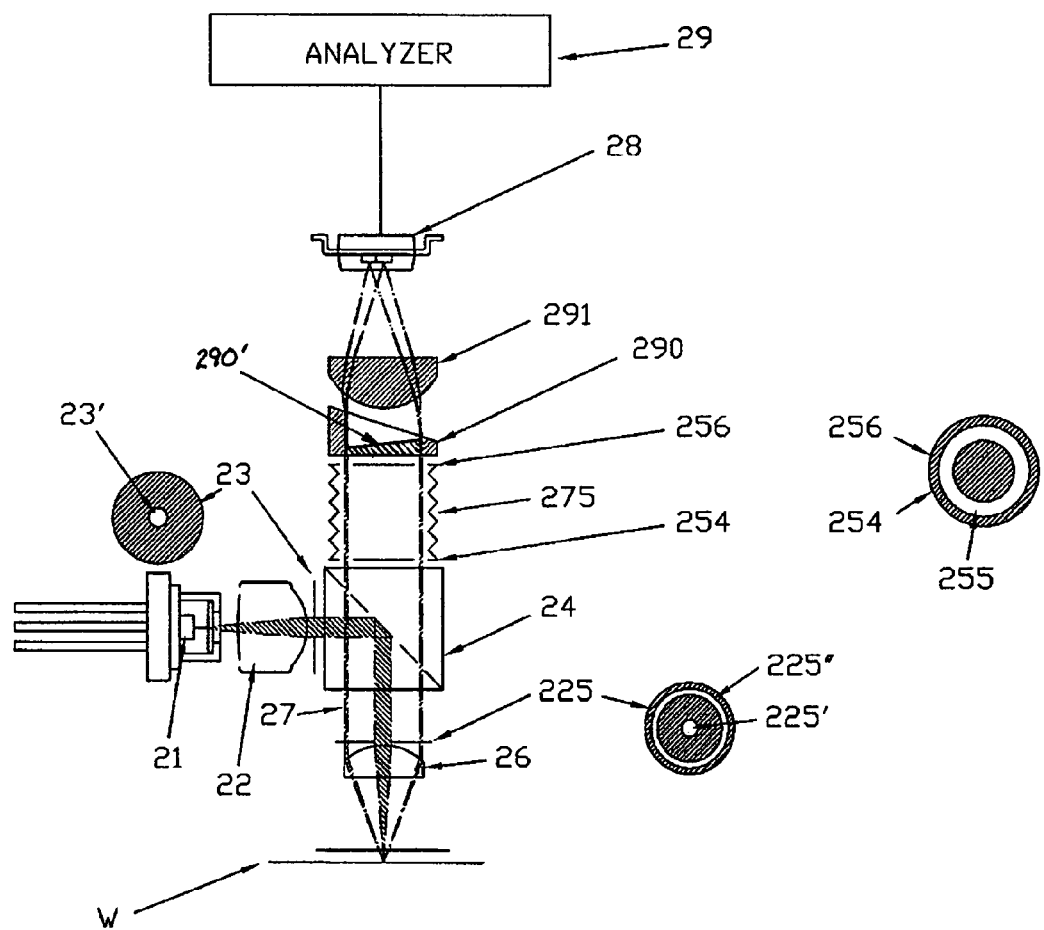
FIG. 3 diagrammatically illustrates an alternative to the embodiment depicted in FIG. 2.

An alternative embodiment of the invention is shown in FIG. 3, which is similar in general to the embodiment depicted in FIG. 2, except instead of aperture element 25 having a single aperture 25', aperture element 225 is utilized having two apertures, e.g., a round center hole 225' and a concentric annular opening 225", are formed. Annular opening 225" has a same nominal diameter as the hole in ring prism 290 and may have an opening width of, e.g., 0.10 mm. The light source follows the same path as described with reference to FIG. 2, but the light reflected and scattered from object surface W is collected by objective lens 26 and collimated toward annular opening 225". Annular beam 27 thus formed goes through beam splitter 24 (or around the small diameter mirror) to ring prism 290. The diameter of annular beam 27 grows or shrinks depending upon the distance to the object surface W. the sensitivity of the measurement can be adjusted by changing the annular opening width of aperture 225". With a narrow opening, the light will quickly shift from a converging annular beam 27 with all light passing through the hole in ring prism 290 to a first bi-cell detector 28 element, to a diverging annular beam 27 with all light striking the prism and being bent toward the second bi-cell detector 28 element.

A wider annular opening 225" requires a greater change in distance to object surface W to shift the light from one element to the other in bi-cell detector 28.

It is customary to use aspheric lenses when collimating and focusing laser light, because aspheric lenses reduce longitudinal spherical aberration. For the instant invention, longitudinal spherical aberration of the single spherical surface of a plano-convex objective lens can be used to advantage because the longitudinal spherical aberration causes the maximum and minimum diameter of the cylindrical beam to converge to the nominal image diameter. A thinner ring image results in greater sensitivity to changes in nominal image diameter. This creates an effect similar to increasing the magnification by placing the ring prism farther from the objective lens.

As noted above with regard to FIG. 2, because an SLD is so intense, even a small fraction scattered into detector 28 could be significant. Thus, to improve the performance of the exemplary embodiment, a third apertured element 254 and a fourth apertured element 256, which have annular openings 255 can be placed between beam splitter 24 (or mirror) and ring prism 29. Annular openings 255, which can have opening widths of, e.g., 0.5 mm in apertured elements 254 and 256, allow only the desired cylindrical beam to pass and block any stray light. Further, a spacer 275 can be positioned between apertured elements 254 and 256 to separate these elements by a distance of, e.g., 6 mm, and spacer 275 can be provided with serrated sides to reflect light back towards the source. Such a formed light trap effectively isolates light source 21 from detector 28.

Further, FIG. 3 illustrates an alternative embodiment in which a second prism 290', e.g., a wedge-shaped prism, is positioned inside ring prism 290 and oriented in an opposite direction to prism 290. As a result of this configuration, a greater separation of the focused spots can be achieved because each prism 290 and 290' will bend the light passing through in opposite directions and toward the detectors of detector system 38.

Figure 4:
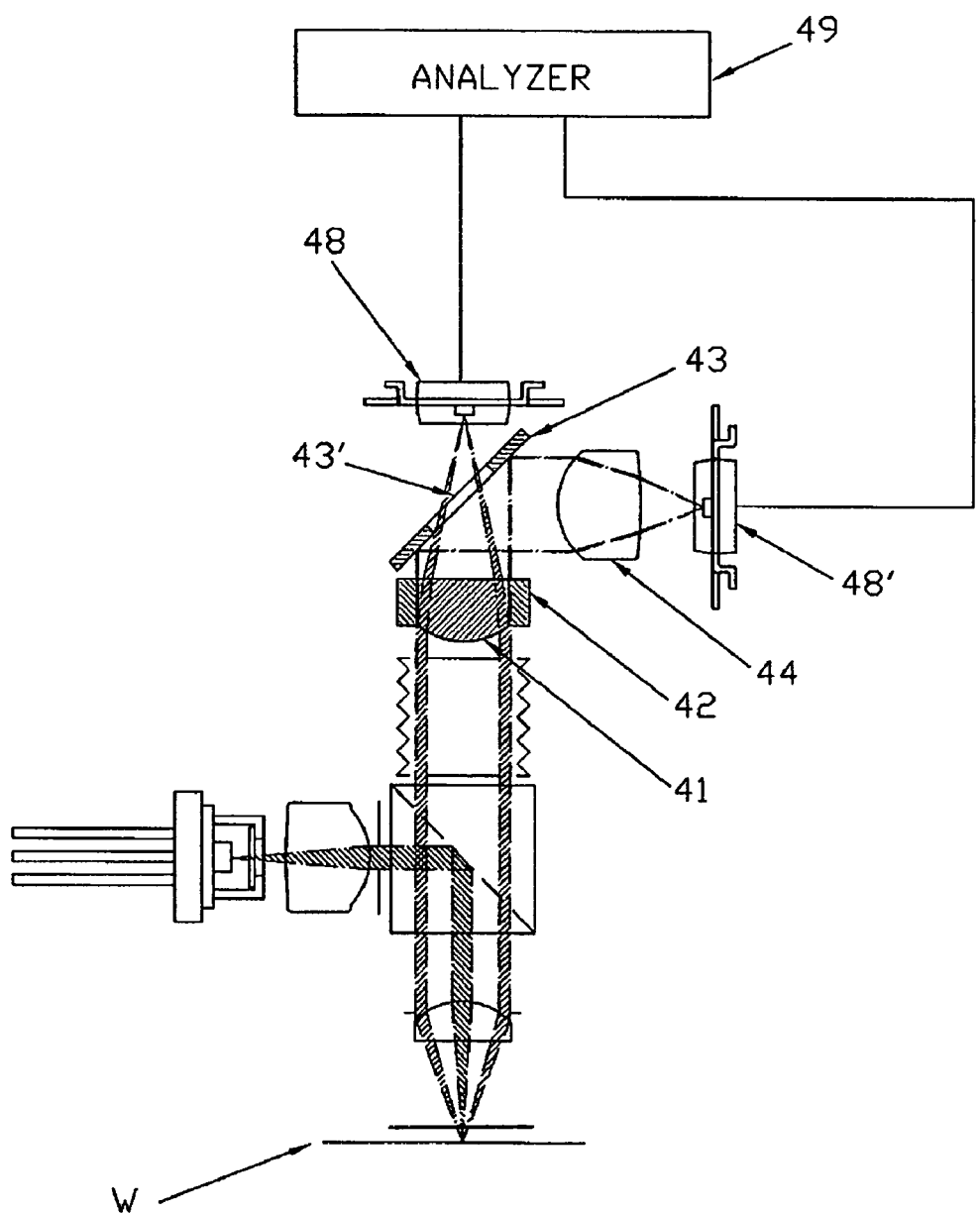
FIG. 4 diagrammatically illustrates another alternative to the embodiment depicted in FIG. 2.

In an alternative embodiment illustrated in FIG. 4, ring prism 290 depicted in FIG. 2 is replaced with a lens 41, whose diameter is the nominal image diameter, surrounded by a flat window 42. Reflected light falling inside the nominal image diameter is focused directly onto a detector 48, while reflected light falling outside the nominal image diameter continues on a parallel path to a 45° mirror 43, which directs the light through a lens 44 to focus on a second detector 48'. The 45° mirror 43 has a hole 43' in it, which allows the reflected light inside the nominal image diameter, i.e., passing through lens 41, to avoid deflection by mirror 43 so as to be directly focused onto detector 48. According to this arrangement, the two light paths are completely separated so two ordinary single detectors 48 and 48' can be used. Further, an analyzer 49 is coupled to detector system 48 to receive and analyze signals related to the two light paths in order to determine the distance to the object or web.

Figure 5:
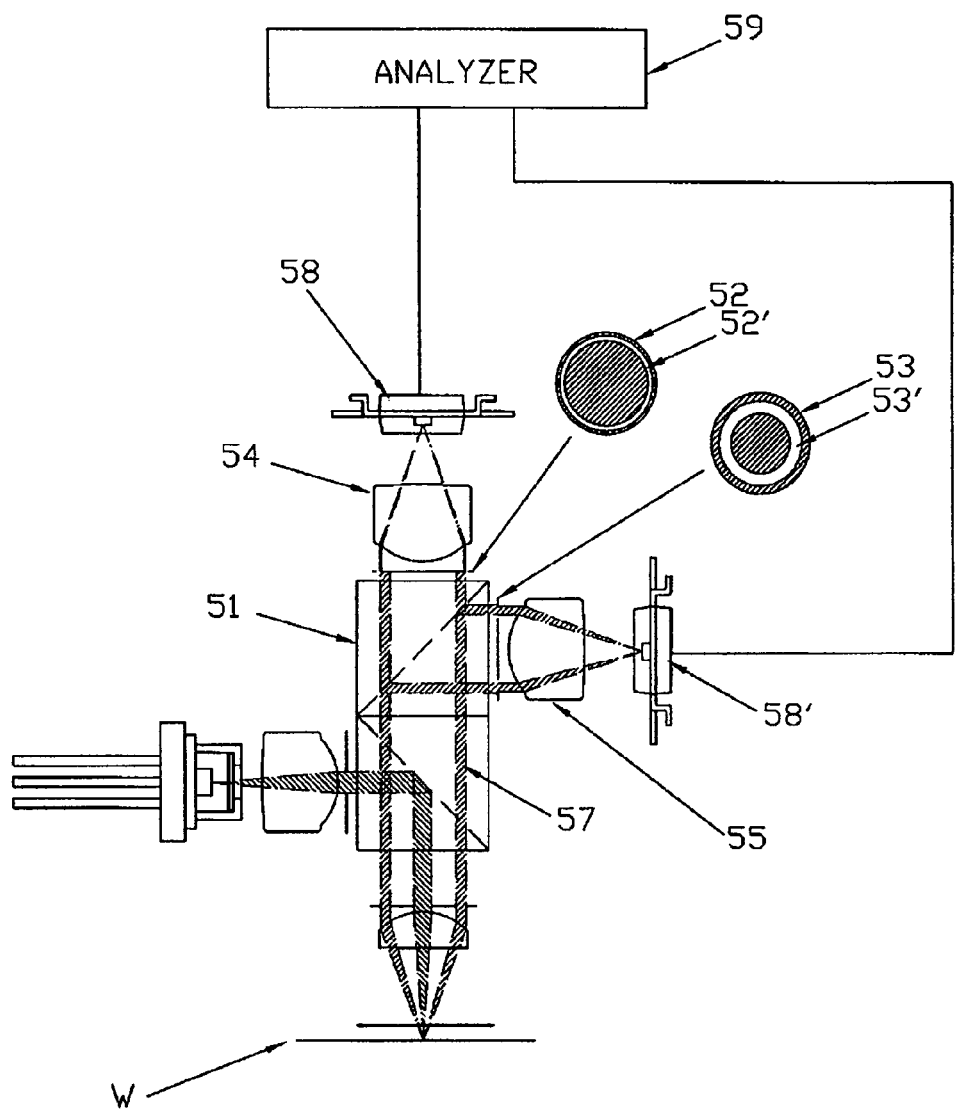
FIG. 5 diagrammatically illustrates an alternative to the embodiment depicted in FIG. 4.

In another alternative embodiment, which is illustrated in FIG. 5, cylindrical parallel beam 57 is split by a second beam splitter 51, e.g., a 45° beam splitter, whereby light traveling straight through splitter 51 goes through an annular aperture 52' of third apertured element 52. An inside diameter of annular aperture 52' is the nominal image diameter, and annular aperture 52' can have an opening width of, e.g., 0.25 mm. A third lens 54 focuses the light passing through annular aperture 52' onto a detector 58. Light reflected 90° by splitter 51 goes through annular aperture 53' of fourth apertured element 53, in which the outside diameter of annular aperture 53' is the nominal image diameter, and annular aperture 53' can have an opening width of, e.g., 0.5 mm. A fourth lens 55 focuses the light passing through annular aperture 53' onto a detector 58'. An advantage of this configuration is that most of the components are conventional. Moreover, an analyzer 59 is coupled to detector systems 58 and 58' to receive and analyze signals from the separate detectors in order to determine the distance to the object or web.

Figure 6:
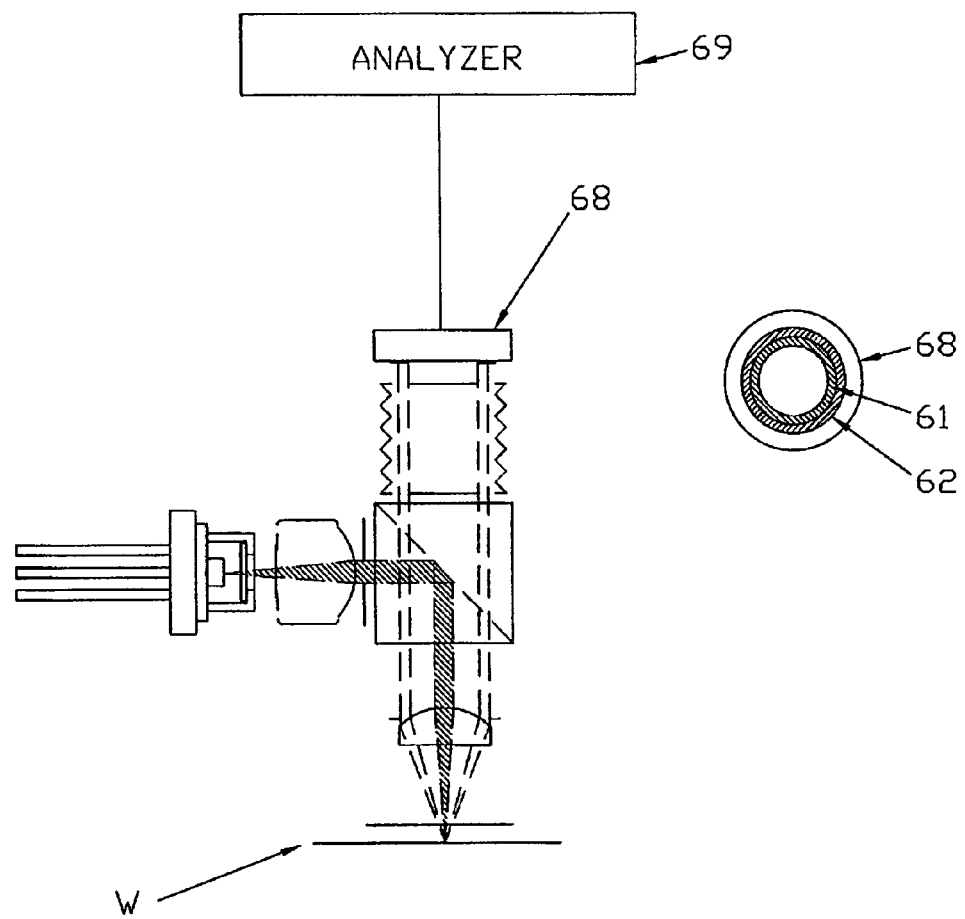
FIG. 6 diagrammatically illustrates an alternative embodiment of the invention depicted in FIG. 1.

In still another alternative embodiment illustrated in FIG. 6, a special detector 68 is utilized. Detector 68 includes two concentric rings 61 and 62 where the split between them is at the nominal image diameter, and analyzer 69 is coupled to detector 68 to receive and analyze signals from concentric rings 61 and 62 in order to determine the distance to the object or web.

Figure 7:
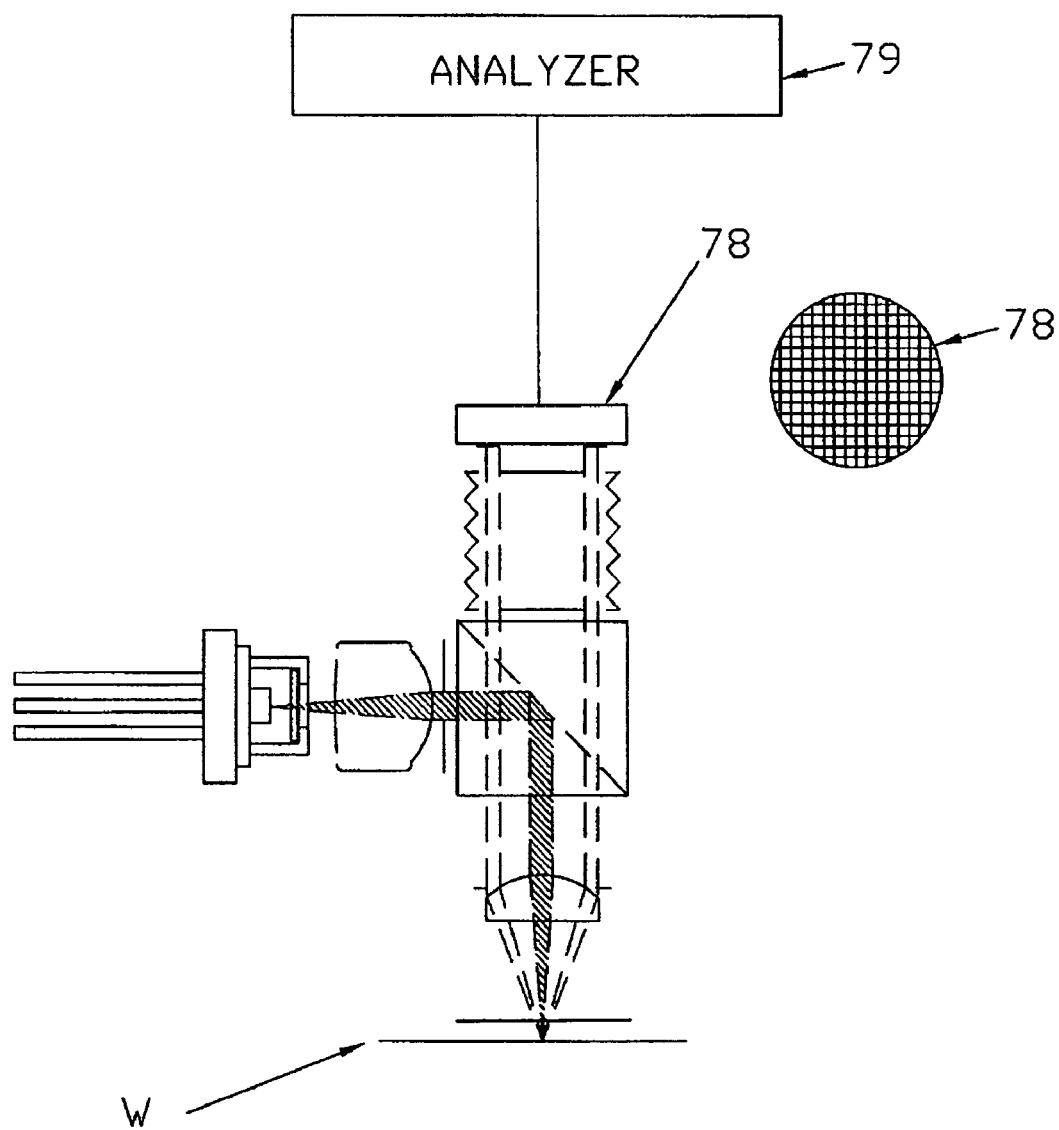
FIG. 7 diagrammatically illustrates another alternative embodiment of present invention depicted in FIG. 1.

Another alternative embodiment illustrated in FIG. 7 employs a special imaging array 78 with software that analyzes the image to determine the diameter of the cylindrical beam. The advantage of this embodiment is that imaging arrays are readily available, such that no special components are required. However, a current disadvantage is that, at this time, known imaging arrays are not fast enough for the application of measuring a fast moving sheet in accordance with the invention. In any event, analyzer 79 is coupled to imaging array 78 in order to receive and analyze the signals from the array in order to determine the distance to the object or web.

It is noted that the embodiments shown above are intended to illustrate various exemplary manners for implementing the features of the present invention. However, it is further noted that these are merely examples and should not be construed as limiting the invention to any particular embodiment. Further, while the optics discussed and depicted use several lenses for collimating and focusing light, it is understood that it is also possible to achieve the same results with different lens configurations and/or materials with no change in the principles of the invention.

The above-discussed optical systems can be improved with a device for selecting only the light returning from the surface of the sheet and rejecting light that has scattered into the sheet. Such a device utilizes two main features of the optical system:
1. a tightly focused projected light spot from the laser diode; and
2. a high frequency position sensitive detector.

Because there are no moving parts, as in convention confocal microscopes, the instant invention can measure at a very high frequency. In this regard, analyzers 19, 29, 39, 49, 59, 69, and 79 analyze the high frequency components of the detector signals composed of light reflected and scattered from the paper surface and excluding most of the light that is returned from inside the sheet. In this way, the distance to the surface can be measured accurately with high speed facilitating the use of this device for both paper thickness and roughness sensors.

It is noted that the projected light spot can quickly change from being tightly focused at the surface of the sheet to a larger and larger diameter as the light diffuses into the sheet. The tightly focused spot at the surface resolves or identifies small features on the paper such as fibers and fiber clumps, and because the sheet is moving, the image of this spot at the detector will have high frequency components. However, the larger spots from further within the sheet will have only lower frequencies because of the inability of larger spots to resolve small features.

By finding the position of the high frequency component of the spot image, the position of the surface of the paper can be isolated; eliminating error cause by averaging all frequencies, which include components of the image from deeper into the sheet.

Initially, the optics are set up so that light forming the ring image is balanced directly between the two detector elements. If the sheet moves from its nominal distance from the lens or window, the balance shifts to one or the other detector element. In addition to the nominal balance shift, small shifts can also be caused by surface irregularities. The tightly focused spot at the surface of the paper can resolve small-scale irregularities and will result in a rapidly shifting component of the intensity at the detector.

The analyzer detects the changes in the diameter of the cylindrical beam that is projected on the analyzer. These diameter changes depend directly on the distance to the sheet being measured. The preferred form of the analyzer produces two measurement signals that change in opposite directions when the distance to the sheet changes. High frequency components of these signals can be included to compensate for the effects of surface topography and light penetration into the sheet. Signal processing can include the following:
1. Fast Fourier transformation (FFT), which gives a complete frequency vs. signal amplitude analysis of the signal;
2. Digital filtering using software to filter the signal in order to pass the frequency ranges of interest.
3. Analog filters.

Furthermore, signal processing can be made to adapt to variations in sheet speed.

In the above-noted procedures employing two output signals from the detectors, the distance to the sheet is calculated using either a ratio:

$$R=A/B$$

or the equation:

$$R=(A-B)/(A+B)$$

Where A is the signal from one of the two detector elements and B is the signal from the other detector element.

If either an FFT algorithm or filters are used, the frequency components of the variable R are divided into frequency bands with associated amplitudes $R_i$, and the results are used to calculate the following:

$$X=\Sigma(a_i * R_i)$$

Where $\Sigma$ indicates summation over all of the selected frequency bands, including zero frequency and coefficients $a_i$ are calibration constants. For a stationary sheet $a_0=1$ (coefficient for zero frequency), and all other values of $a_i$ are zero.

Variable X has a nearly linear relationship with the position of the surface of the paper. Nevertheless, sometimes it is advantageous to use a linearization algorithm such as a third power polynomial to calculate the final distance to the sheet:

$$\text{Distance}=b_0+b_1*X+b_2*x^2+b_3*x^3$$

Where $b_0$, $b_1$, $b_2$ and $b_3$ are calibration constants.

Another advantage of the instant invention is alignment tolerance. Conventional confocal microscopes require the pinhole to be aligned to a tightly focused spot, and a small misalignment of the pinhole to the focus can cause significant degradation of performance. The present invention aligns detector system to the cylindrically collimated beam before it is focused. Moreover, the larger diameter and area of the light beam allows the alignment tolerance to be relaxed.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A device for determining a distance to an object, comprising:
    a low coherence light source;
    at least one lens arranged to focus light from the low coherence light source onto the object and to collect light reflected and scattered from the object;
    a window arranged between the lens and the object;
    an apertured element comprising an annular aperture structured and arranged to form a cylindrical light beam from the reflected and scattered light;
    a detector system structured and arranged to receive the cylindrical light beam, wherein the detector system is sensitive to light beam diameter; and
    a determining device structured and arranged to determine a distance to the object based upon signals from the detector system.

2. The device in accordance with claim 1, wherein the low coherence light source comprises a superluminescent diode.

3. The device in accordance with claim 1, wherein the low coherence light source produces a coherence length significantly less than twice a distance between the object and a surface of the window facing the object.

4. The device in accordance with claim 1, wherein the window is flush with an air bearing surface.

5. The device in accordance with claim 1, further comprising an air bearing,
    wherein the window is supported by the air bearing at a distance of 100-300 micrometers from the object.

6. The device in accordance with claim 1, wherein the apertured element comprises an annular aperture structured and arranged to form an annular light beam from the reflected and scattered light; and
    the determining device is structured and arranged to receive the annular light beam, wherein the detector system is sensitive to light beam diameter.

7. The device in accordance with claim 1, wherein the at least one lens is structured and arranged to collimate the source light to a narrow central beam.

8. The device in accordance with claim 1, wherein the at least one lens comprises an aspheric lens structured and arranged to focus the source light onto the object.

9. The device in accordance with claim 1, wherein the at least one lens comprises a plano-convex lens structured and arranged to focus the source light onto the object.

10. The device in accordance with claim 1, further comprising an element arranged in a path of the cylindrical light beam to allow only the cylindrical beam to pass and to block other light.

11. The device in accordance with claim 1, wherein the object is a moving object and the analyzer measures the distance to the object by receiving a high frequency component of the detector system signals to measure an amount of light with high frequency variations reflected and scattered from a surface of the object and passing the annular aperture and directed to the detector system, and analyzing high frequency signals to determine the distance to the surface of a moving object.

12. The device in accordance with claim 1, wherein the distance determination in the analyzer is a measure of surface profile.

13. The device in accordance with claim 1, wherein the at least one lens comprises at least one lens arrangement positioned on each side of the object; and
    the analyzer is further structured and arranged to determine the caliper of the object.

14. The device in accordance with claim 13, wherein a separation between the lens arrangements is known, and the caliper is determined in the analyzer by determining the distance to the object from each lens arrangement, and subtracting a sum of the determined distances from a separation of the lens arrangements.

15. The device in accordance with claim 13, wherein the object is a moving web.

16. The device in accordance with claim 1, further comprising a wedge-shaped ring prism having a hole with a diameter corresponding to the diameter of the cylindrical light beam.

17. The device in accordance with claim 16, wherein the ring prism is positioned upstream of the detector system relative to the optical direction so light falling inside the diameter of the hole is directed in one direction while light falling outside the diameter of the hole is bent by the prism in another direction.

18. The device in accordance with claim 17, wherein the detector system comprises at least two detectors arranged to receive the light directed in the one direction and to receive the light bent in the another direction.

19. The device in accordance with claim 16, wherein another wedge-shaped prism is arranged in the hole of the wedge-shaped ring prism.

20. The device in accordance with claim 19, wherein the wedge-shaped prisms are arranged upstream of the detector system relative to the optical direction so that light falling inside the diameter of the hole is bent by the inside prism in one direction while light falling outside the diameter of the hole is bent by the outside prism in another direction.

21. The device in accordance with claim 1, further comprising:
    a flat window with a hole and a lens arranged in the hole, so that light falling inside the diameter of the hole is focused by the lens in one direction; and
    a mirror arranged downstream of the flat window and lens to direct light falling outside the diameter of the hole, which passes through the flat window, in another direction.

22. The device in accordance with claim 1, further comprising:
    a beam splitter arranged to split the cylindrical light;
    a second apertured element having an annular aperture having an inner diameter corresponding to the diameter of the cylindrical light; and
    a third apertured element having an annular aperture having an outer diameter corresponding to the diameter of the cylindrical light,
    wherein a first split portion of the split cylindrical light is directed through the second apertured element so that an increasing amount of light will pass to a detector of the detector system as the cylindrical beam diameter increases, and
    wherein a second split portion of the split cylindrical light is directed through the third apertured element so that an increasing amount of light will pass to another detector of the detector system as the cylindrical beam diameter decreases.

23. The device in accordance with claim 1, wherein the detector comprises concentric detectors.

24. The device in accordance with claim 1, wherein the detector comprises a detector array.

25. The device in accordance with claim 1, wherein the detector comprises an imaging array.

26. The device in accordance with claim 1, wherein the light source comprises a superluminescent diode.

27. A process for determining a distance to an object, comprising:
   focusing, with at least one lens, light from a low coherence light source onto the object through a window, and collecting, with the at least one lens, light reflected and scattered from the object;
   forming a cylindrical light beam from the reflected and scattered light;
   monitoring the diameter of the cylindrical light beam; and
   determining a distance to the object based upon signals related to the monitored diameter of the cylindrical light beam.

28. The process in accordance with claim 27, further comprising maintaining a distance of 100-300 micrometers between the object and a surface of the window facing the object.

29. The process in accordance with claim 28, wherein the object is a moving web.

30. The process in accordance with claim 28, wherein the distance is maintained with an air bearing.

31. The process in accordance with claim 27, wherein the window is arranged flush with an air bearing.

32. The process in accordance with claim 27, wherein the low coherence light source is a superluminescent diode.

33. The process in accordance with claim 27, wherein the low coherence light source produces a coherence length significantly less than twice a distance between the object and a surface of the window facing the object.

34. The process in accordance with claim 27, further comprising collimating the source light to a narrow central beam.

35. The process in accordance with claim 27, further comprising allowing the cylindrical light beam to pass while blocking other light.

36. The process in accordance with claim 27, wherein the cylindrical light beam is formed by the reflected and scattered light passing through an apertured element comprising an annular aperture and the determining of the distance comprises:
   receiving a high frequency component of the detector system signals to measure an amount of light with high frequency variations reflected and scattered from a surface of the object and passing through the annular aperture to the detector system; and
   analyzing high frequency signals to determine the distance to the surface of a moving object.

37. The process in accordance with claim 27, further comprising measuring a surface profile of the object.

38. The process in accordance with claim 27, further comprising determining the caliper of the object.

39. The process in accordance with claim 38, wherein a separation between the lens arrangements is known, and the determining the caliper comprises determining the distance to the object from each lens arrangement, and subtracting a sum of the determined distances from a separation of the lens arrangements.

40. The process in accordance with claim 27, further comprising:
   directing the cylindrical light beam through a wedge-shaped ring prism having a hole with a diameter corresponding to the diameter of the cylindrical light beam;
   directing light falling inside the diameter of the hole in one direction; and
   bending light falling outside the diameter of the hole in another direction.

41. The process in accordance with claim 27, further comprising:
   directing the cylindrical light beam through a wedge-shaped ring prism having a hole with a diameter corresponding to the diameter of the cylindrical light beam with another wedge-shaped prism arranged in the hole;
   bending light falling inside the diameter of the hole in one direction; and
   bending light falling outside the diameter of the hole in another direction.

42. The process in accordance with claim 27, further comprising:
   directing the cylindrical light beam through a flat window with a hole and a lens arranged in the hole;
   focusing light falling inside the diameter of the hole in one direction; and
   directing light falling outside the diameter of the hole, which passes through the flat window, in another direction.

43. The process in accordance with claim 27, further comprising:
   splitting the cylindrical light;
   directing a first split portion of the split cylindrical light through an apertured element so that an increasing amount of light will pass to a detector of the detector system as the cylindrical beam diameter increases; and
   directing a second split portion of the split cylindrical light through a second apertured element so that an increasing amount of light will pass to another detector of the detector system as the cylindrical beam diameter decreases.

* * * * *